Patented Jan. 3, 1950

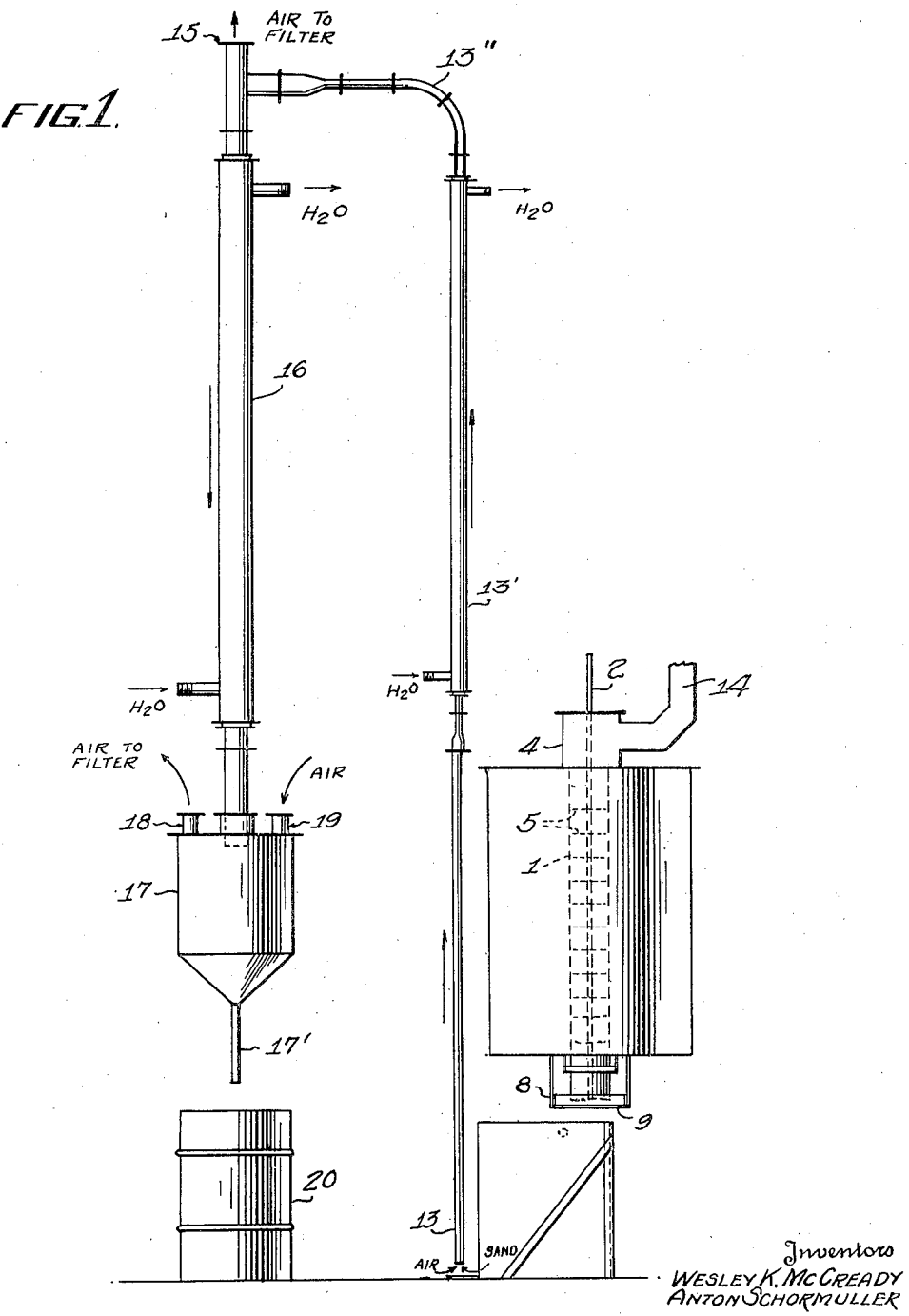

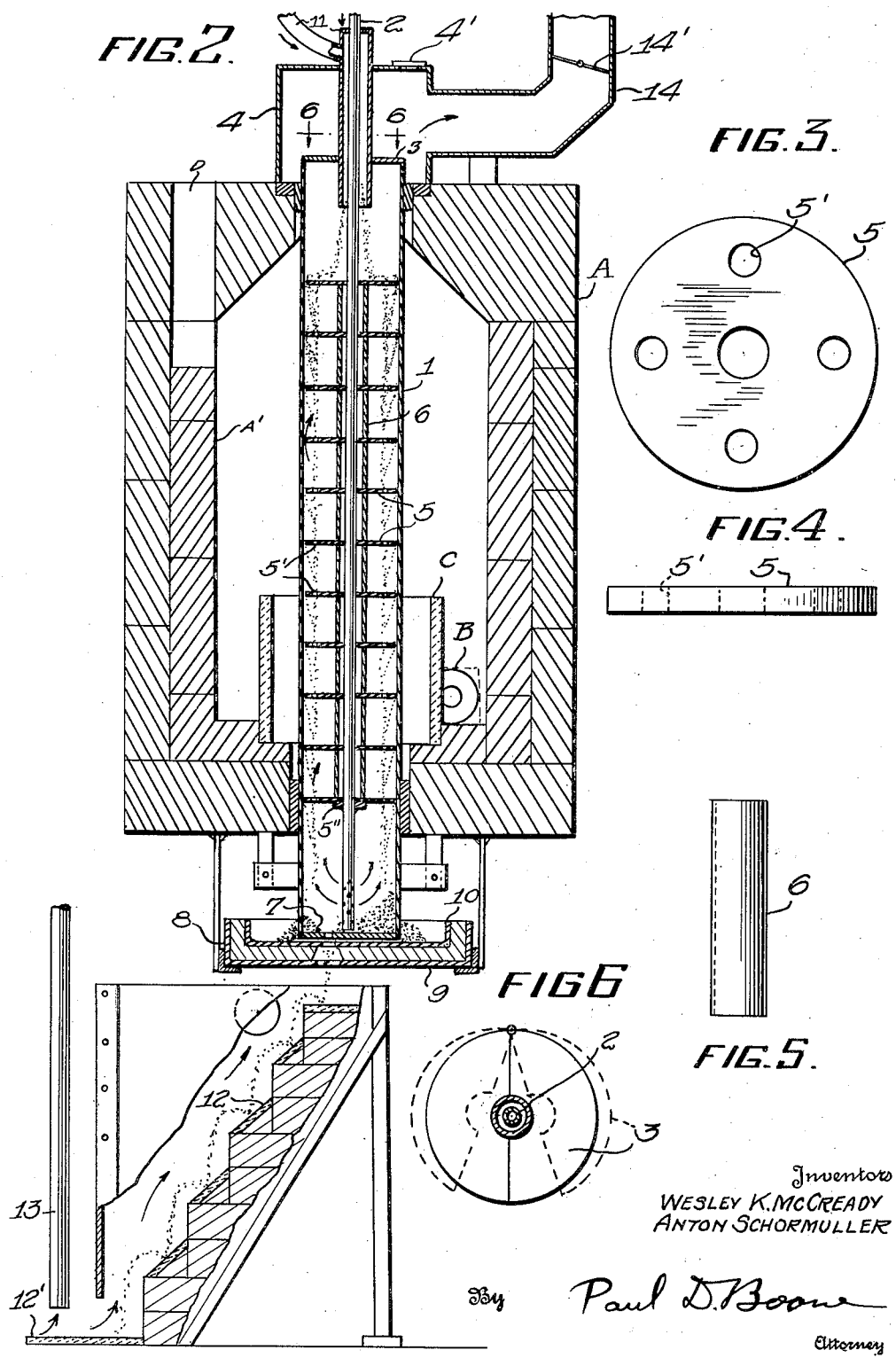

2,493,304

UNITED STATES PATENT OFFICE 2,493,304

FURNACE

Wesley K. McCready and Anton Schormuller, Painesville, Ohio, assignors to Clifton Products, Inc., Painesville, Ohio Application October 31, 1945, Serial No. 625,744

7 Claims. (Cl. 263—30)

This invention relates to a furnace, operable in a continuous manner, for heating granular inorganic material while simultaneously subjecting the descending material to an ascending stream of a gas.

This furnace has various usages, but a specific use is as a continuous process for treating granular inorganic material, such as silicon compounds, to purify the same, and more particularly for purifying quartz sand.

Quartz sand has various impurities, such as metals and metallic compounds, including iron and oxides of iron and alumina. In addition, it contains organic impurities in small amounts. Granular material, such as sand, usually has fines, which are chiefly the product from abrasion in handling, shipping and cleaning, with some spawling from temperature shock.

Several methods have been proposed to purify sand. In one method sand is passed counter-current to vaporized ammonium chloride, wherein hot dry air is admitted to support falling sand, thus allowing more time for contact. In another method silica is ploughed as a comparatively tremendous load vertically through a silica-lined tube with fragile silica paddles.

It is an object of the present invention to provide a furnace so constructed that the granular material is slowed in its descent through the heated vertical tube to permit ample time and intimacy of contact with a gas, yet, because the apparatus does not permit mass retention of the granular material, there is no strain on the equipment.

It is a more specific object of this invention to provide an apparatus which comprises a furnace with a vertical, exteriorly heated tube whose inlet for the solids and outlet for gas are at the upper portion, whose outlet for heated solids is in the base of this tube, and within which tube there is an inner tube with one or a plurality of openings in its lower portion for introducing gas, this inner tube also serving to support a series of vertically spaced, perforated baffles.

It is an additional object of this invention to provide a furnace with a vertical tube, within which tube there is a series of vertically spaced, perforated baffles which afford clearance between said baffles and wall of the tube to retard the flow of solid material while permitting free flow and intimate contact of gases with descending solids, these spaced baffles being supported upon an inner vertical tube which has a series of openings in its lower portion for introducing and preheating the gas.

Other and further important objects of this invention will become apparent from the following description taken in conjunction with the drawings in which:

Fig. 1 illustrates a side elevation of a general assembly of the units of the apparatus for carrying out the process.

Fig. 2 is a central vertical sectional view of the treating furnace and initial cooler.

Fig. 3 is a plan view of one of the plates inside the vertical chlorinator tube.

Fig. 4 is a side elevation of one of these plates.

Fig. 5 is a side elevation of a spacing tube.

Fig. 6 is a sectional view of split disk at the top taken on line 6—6 of Fig. 2.

Referring to the drawings, and first to Fig. 2, it will be seen that the furnace is composed of furnace wall A having a tapered upper interior portion. The walls of the furnace encase furnace tube 1 which extends through the top and base thereof. This tube made of fused quartz is suitably 6 feet long with an 8 inch nominal internal diameter. Furnace tube 1 is covered with a split disk 3 provided with a companion half circular hole in each half of the split disk to accommodate a forked Pyrex tube 11. The split around member 11 is adjustable as shown in Fig. 6 to regulate air flow if desirable as well as to hold heat and prevent unnecessary eddying to eliminate the deposition of dust around the tube top. Tube 11 extends a short distance below the split disk 3. An internal tube 2 of fused quartz for the introduction of chlorine extends vertically throughout the length of furnace tube 1 into tube 11 and slightly beyond its upper end. Internal tube 2 suitably has an outside diameter of ¾ inch. It is provided with a flat sealed bottom for a supporting surface and is perforated near the sealed end for gas sparging. A hood 4 extending above the top of the furnace and encasing the top of furnace tube 1 has a discharge pipe 14 provided with a control damper 14'. Another draft control 4' situated in the top of hood 4 and above split disk 3 allows pulling in of air to provide high velocity of air passing by the split disk exit. The suction, whereby the high velocity of this gas is achieved, can be brought about through a conventional way, such as a chimney draft. Other mechanical equivalents can be used, such as a blower on pipe 14.

A series of vertically spaced discs or baffle plates 5 surround the inner tube 2 which acts as centering and supporting shaft therefor. Just below lowermost of these discs is a support 5" fused to the wall of said inner tube. Disc 5 as shown in Fig. 3 has a central hole through which the tube 2 extends and a series of other holes 5' through which sand can descend and gases ascend. Between the circumference of disc 5 and the inner wall of furnace tube 1 there is a clearance which also allows for the passage of sand and gases. The discs 5 are spaced apart by fused quartz sleeves 6, shown in Fig. 3, which also encircle tube 2.

Within the furnace wall A and near the base is a burner B. A refractory sleeve C, surrounding that lower section of tube 1 which is within the furnace wall, serves to more evenly distribute the heat around it and prevent flame impingement on tube 1. On the inside of cylindrical furnace wall A is a supporting refractory lining $A^1$, which has an opening D communicating with the opening in the furnace wall for the removal of combustion gases.

Bottom frame 8 is supported from the bottom wall of the furnace, independently of the assembly. It supports in turn a steel tray 9 with a bed of asbestos fiber, on which rests a fused quartz tray 10 containing a bed of quartz sand in which is firmly embedded orifice disc 7. This fused quartz discharge orifice disc, which is rotatable, is provided with various size holes. The size of the opening may thus be made to suit feed rates and draft adustments. Concentric with the discharge orifice in disc 7 are increasing size holes in trays 10 and 9 respectively. By means of this orifice gradation, contact of the product with air and draft control is effected by the discharge opening in the fused quartz disc only. Slotted holes in support members of frame 8 permit the bottom assembly to be lowered or moved into place, contacting the squared end of tube 1. Further sealing is made by a sand bank.

Change in discharge rate may be accomplished by rotating plate 7 until that size orifice comes into position which is best suited. Finally, the sealed end of preheating chlorine tube 2 is brought to rest in the center of disc 7. This tube is steadied at the top by any suitable means (not shown, such as a clamp).

A cascade 12 is positioned below the opening in the steel tray 9. The inclines are made of quartz. A quartz tube 13 extends vertically, as shown in Fig. 1, above the foot of the cascade leaving a slight clearance between its lower end and the quartz horizontal floor plate 12'. This tube is surrounded by a water jacket 13' whereby the ascending sand is cooled further. Tube 13 has a curved section 13" at the top which joins onto a larger vertical pipe 15 affording a T-construction. The quartz pipe 15 is surrounded throughout most of its length by a water jacket 16. Pipe 15 empties into surge bin or separator 17 which is provided at the top with an air inlet 19 and exit 18. The funnel-shaped bottom is provided with a pipe 17' emptying into some receptacle such as a barrel 20.

The purification of raw quartz sand by this furnace will now be described. In this continuous method raw quartz sand is fed into the furnace tube 1 through the side arm of Pyrex tube 11. The sand then falls through the annular space provided by the vertical section of this tube 11, which is in a concentric position with reference to tube 2. In this interval this arrangement prevents exposure of the sand to impurities which are being carried off by ascending high velocity air until well into the furnace tube 1. It strikes the first of the discs 5. Part of the sand goes through the four holes 5' in sand disc or baffle and part clears between the space between the periphery of the disc and the walls of tube 1. The sand does not channel down the sides. As it descends it is showered from baffle to baffle, feeding from the surface of each succeeding baffle through the holes and off the entire periphery. Sand leaving the periphery in descent appears to impinge on the inner wall of tube 1, bouncing to various degrees back into the shower of solid particles under the baffle. Thus an undulating path is traversed from tube wall to center during descent as well as a similar course on the baffle surface. The tortuous course of the sand throughout the length of tube 1 provides an interval of time for the sand to attain a temperature of 2100–2300° F. and be retained thereat, and for such impurities as iron- and aluminum oxide to react with chlorine. The air which enters through the hole in the discharge orifice in plate 7 supports combustion of the organic impurities and carries away the metallic oxides, which are produced, along with fines present in the sand through the holes in plates 3 up through pipe 14.

For a furnace tube 8" (inside diameter) x 6' operated at a temperature of 2200° F. or higher, chlorine is proportioned by a rotometer at a rate of 1 lb. per hour per 100 lbs. of sand. For a ¾" diameter discharge orifice a draft of from ½" to ¾" of water is maintained within the furnace tube. For this size furnace, sand is orifice fed at a rate of 120 lbs. per hour. The retention time of any particle of sand in tube 1 is about 4 seconds. Since 32 ounces of sand are fed in streamline flow per 60 seconds (120 lbs. per hr.) the weight of the shower of sand falling through tube 1 from top to bottom at any given instant is 2 ounces $$\left(\frac{4}{60} \times 32\right)$$

This is a major advantage of our process over other processes, as explained subsequently.

The sand which passes through the orifice in plate 7 glows due to its temperature of substantially 2100–2300° F. Quenching begins immediately after discharge from the furnace tube by the sand descending cascade 12, falling or bouncing from one fused inclined quartz plate to another plate, counter-current to the stream of air. By the time it has reached the foot of the cascade it has cooled to approximately 1000° F.

It is then continuously sucked up through a quartz tube 13 by a high velocity cool air stream rising vertically through a jacketed water-cooled heat-exchanger. Suction is provided at 15 by any conventional means such as a blower, and pulls in sand at 13. The resultant temperature of the sand through tube 13 is about 500° F. Subsequent cooling of the air and sand to storage temperatures is effected while conveying the mixture through another water-jacketed, vertical cooler 15 where its descent may be controlled by drawing off the air to allow free fall of the particles or further retarded by pulling in air against its descent.

It is best to pre-heat the chlorine before contacting the sand. It is preferred to admit air during the said heating step. This serves a three-fold purpose: to render chlorine more corrosive to iron and iron compounds, to provide oxygen to burn out organic matter, and to sweep out ash, metallic oxides and fine sand. As stated supra, an exceedingly fine oxide powder is produced as a by-product. We believe that the first action is the formation of metal chlorides from the inorganic impurities, which impurities sublime and decompose to their oxides.

In the quenching step, while air is the most readily available gas, it will be understood that carbon dioxide or other inert gases may be used. It is preferred to quench the treated sand by effecting the exchange and removal of heat in three stages. In the first stage the sand in a completely dispersed stream travels countercurrent to air. Or air can be passed in a concurrent direction in intimate contact with highly dispersed sand. In the second and third stages an air and sand mixture is passed through a tube or pipe chilled by heat exchange, as by water.

We prefer to carry out the process in an apparatus system, all of whose interior exposed surfaces are made of fused quartz or like material; this prevents contamination of the granular material undergoing treatment with other refractory materials.

Some of the advantages of our apparatus are as follows: (1) no moving parts are required; (2) cemented or keyed-in lining is not required; (3) there is no mass retention of sand, only a shower of particles amounting to an estimated 2 ounces and consequently no load strain on the equipment; (4) the continuous flow of purified sand can be stopped or started at a moment's notice; (5) indirect heating bars the possibility of contamination from fuel source; (6) there is low area floor space; (7) the maintenance cost is low.

The various metallic oxide by-products, such as iron oxide, produced in the tube furnace are conveniently disposed of along with the stack gases. Chlorine is not worth recovery, being used initially in not over 20 lbs. per ton of treated sand.

While the apparatus system of Figs. 1 and 2 was described with particular reference to quartz sand, obviously it is not limited to this kind of sand and can be utilized with other sands and/or with other free-flowing, granular inorganic compounds especially the silicon derivatives.

Although this invention has been described in considerable detail, it is to be understood that such description is intended as illustrative rather than limiting, as the inventon may be variously embodied and is to be interpreted as claimed.

We claim.

1. A furnace including a vertical tube, means for exteriorly heating the said tube, another tube likewise vertically positioned within it and extending to the bottom portion thereof, said inner tube having spaced openings in the lower portion for discharging a gas, means for withdrawing gas from the upper portion of the exterior tube, means for continuously introducing granular material into the upper portion of the exterior tube, the base for said exterior tube having an opening for continuously removing the granular material, a series of vertically spaced baffle discs which discs both have holes therein and leave small clearance between them and the outer vertical tube whereby the solid material can pass downwardly, and supporting and retaining spacers between said discs, said discs and spacers supported by the said inner tube.

2. A furnace including a vertical tube, means for exteriorly heating said tube, another tube likewise vertically positioned and residing concentrically within it extending to the bottom portion thereof, said inner tube having spaced openings in the lower portion for discharging a gas, a supply pipe for continuously introducing granular material extending into the upper portion of the exterior tube and positioned substantially in the center thereof, means for withdrawing gases from the upper portion of the exterior tube, the base for said exterior tube having an opening for continuously removing the granular material, a series of vertically spaced baffle discs which discs both have holes therein and leave small clearance between them and the outer vertical tube whereby the solid material can pass downwardly, and supporting and retaining spacers between said discs, said discs and spacers supported by the said inner tube.

3. A furnace including a vertical tube, means for exteriorly heating the said tube, another tube likewise vertically positioned concentrically within it and extending to the bottom portion thereof, said inner tube having spaced openings in the lower portion for discharging a gas, means for withdrawing gas from the upper portion of the exterior tube, a supply pipe for continuously introducing solid material extending into the upper portion of the exterior tube and enclosing the upper section of the inner tube which is within the exterior tube, the base for said exterior tube having an opening for continuously removing the granular material, a series of vertically spaced baffle discs which discs both have holes therein and leave small clearance between them and the outer vertical tube whereby the solid material can pass downwardly, and supporting and retaining spacers between said discs, said discs and spacers supported by the said inner tube.

4. A furnace including a vertical tube, means for exteriorly heating the said tube, another tube likewise vertically positioned concentrically within it and extending to the bottom portion thereof, said inner tube having spaced openings in the lower portion for discharging a gas, means for withdrawing gas from the upper portion of the exterior tube, a supply pipe for introducing solid material extending into the upper portion of the exterior tube and enclosing the upper section of the inner tube which is within the exterior tube, the inner tube supported on a plate provided with openings of different diameters for discharge of the solid material, which plate can be turned, a series of vertically spaced perforated baffle discs with supporting and retaining spacers between said discs, said discs and spacers supported by said inner tube.

5. A furnace including a vertical tube, means for exteriorly heating the said tube, said tube having a hood provided with a discharge conduit and adjustable means for draft control, another tube likewise vertically positioned within the exterior tube extending to the bottom portion thereof, said inner tube having spaced openings in the lower portion for discharging a gas, a supply pipe for introducing solid material extending into the upper portion of the exterior tube and enclosing the upper section of the inner tube which is within the exterior tube, a base plate provided with openings of different diameters, which plate can be turned, a series of vertically spaced perforated baffle discs with supporting and retaining spacers between said discs, said discs and spacers supported by said inner tube.

6. A furnace including a vertical tube, means for exteriorly heating the said tube, another tube likewise vertically positioned within it and extending to the bottom portion thereof, said inner tube having at least one opening at the lower end for discharging a gas, means for withdrawing gas from the upper end of the exterior tube, means for continuously introducing granular material in the upper portion of the exterior tube, the base for the exterior tube having an opening for continuously removing the granular material, a series of vertically spaced baffle discs, which discs both are provided with holes therein and leave small clearance between them and the inner wall of the outer vertical tube whereby the solid material can pass downwardly, and supporting and retaining spacers between the discs, said discs and spacers supported by the said inner tube.

7. A furnace including a vertical tube, means for exteriorly heating the said tube, another tube likewise vertically positioned concentrically within it and extending to the bottom portion thereof, said inner tube having at least one opening at its lower end for discharging a gas, means for withdrawing gas from the upper portion of the exterior tube, a supply pipe for continuously introducing solid material extending into the upper portion of the exterior tube and enclosing the upper section of the inner tube which is within the exterior tube, the base for said exterior tube having an opening for continuously removing the granular material, a series of vertically spaced baffle discs, which discs both have holes therein and leave a small clearance between them and the outer vertical tube whereby the solid material can pass downwardly, and supporting and retaining spacers between the discs, said discs and spacers supported by the said inner tube.

WESLEY K. McCREADY.
ANTON SCHORMULLER.

REFERENCES CITED

The following references are of record in the file of this patent:

UNITED STATES PATENTS

| Number | Name | Date |
|---|---|---|
| 446,996 | Phelps | Feb. 24, 1891 |
| 464,934 | Dubbs | Dec. 8, 1891 |
| 1,120,879 | Zorn | Dec. 15, 1914 |
| 1,368,396 | Hulett | Feb. 15, 1921 |
| 2,070,161 | Flinn | Feb. 9, 1937 |
| 2,079,017 | Iddings et al. | May 4, 1937 |
| 2,147,551 | Saives | Feb. 14, 1939 |
| 2,211,734 | Soderberg | Aug. 13, 1940 |
| 2,233,155 | Adams | Feb. 25, 1941 |
| 2,353,505 | Scheineman | July 11, 1944 |

FOREIGN PATENTS

| Number | Country | Date |
|---|---|---|
| 41,891 | Germany | May 21, 1887 |